US006908644B2

(12) United States Patent
Weingartz

(10) Patent No.: US 6,908,644 B2
(45) Date of Patent: Jun. 21, 2005

(54) CLEARCOAT INSITU RHEOLOGY CONTROL VIA UV CURED OLIGOMERIC ADDITIVE NETWORK SYSTEM

(75) Inventor: Timothy P. Weingartz, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/248,642

(22) Filed: Feb. 4, 2003

(65) Prior Publication Data

US 2004/0151843 A1 Aug. 5, 2004

(51) Int. Cl.[7] ........................ C08J 7/04; C09D 133/04; C09D 175/04

(52) U.S. Cl. ....................... 427/515; 427/517; 427/519; 522/4; 522/8; 522/18; 522/12; 522/96; 522/99; 522/103; 522/17; 522/173; 522/182

(58) Field of Search ................................ 427/508, 515, 427/517, 519; 522/4, 8, 12, 18, 96, 103, 107, 99, 173, 182, 7, 174, 172, 179

(56) References Cited

U.S. PATENT DOCUMENTS

| | | | | | |
|---|---|---|---|---|---|
| 2,982,845 | A | | 5/1961 | Yenni et al. | |
| 3,472,995 | A | | 10/1969 | Browning et al. | |
| 4,370,538 | A | | 1/1983 | Browning | |
| 4,681,258 | A | | 7/1987 | Jenkins et al. | |
| 4,788,402 | A | | 11/1988 | Browning | |
| 5,080,056 | A | | 1/1992 | Kramer et al. | |
| 5,245,153 | A | | 9/1993 | Singer et al. | |
| 5,296,667 | A | | 3/1994 | Marantz et al. | |
| 5,334,235 | A | | 8/1994 | Dorfman et al. | |
| 5,364,663 | A | | 11/1994 | McCune, Jr. et al. | |
| 5,442,153 | A | | 8/1995 | Marantz et al. | |
| 5,453,451 | A | * | 9/1995 | Sokol | 522/42 |
| 5,679,721 | A | * | 10/1997 | Courtoy et al. | 522/95 |
| 5,808,270 | A | | 9/1998 | Marantz et al. | |
| 5,877,231 | A | * | 3/1999 | Biller et al. | 522/93 |
| 6,110,987 | A | * | 8/2000 | Kamata et al. | 522/64 |
| 6,161,889 | A | | 12/2000 | Davis, Jr. et al. | |
| 6,197,844 | B1 | * | 3/2001 | Hamrock et al. | 522/167 |
| 6,372,298 | B1 | | 4/2002 | Marantz et al. | |
| 6,428,596 | B1 | | 8/2002 | Urevich et al. | |
| 6,500,877 | B1 | * | 12/2002 | Krohn | 522/96 |
| 6,509,389 | B1 | * | 1/2003 | Krohn | 522/92 |
| 6,528,126 | B1 | | 3/2003 | Ferrer et al. | |
| 6,635,341 | B1 | * | 10/2003 | Barancyk et al. | 428/323 |
| 6,716,891 | B1 | * | 4/2004 | Meisenburg et al. | 522/90 |
| 2003/0138617 | A1 | * | 7/2003 | Courtoy et al. | 428/304.4 |
| 2003/0191272 | A1 | | 10/2003 | Flosbach et al. | |

FOREIGN PATENT DOCUMENTS

| | | |
|---|---|---|
| EP | 1 348 746 A1 | 10/2003 |
| WO | WO 00/67919 | 11/2000 |
| WO | WO 02/053298 A2 | 7/2002 |
| WO | WO 03/068878 A2 | 8/2003 |

* cited by examiner

*Primary Examiner*—Susan Berman
(74) *Attorney, Agent, or Firm*—Brooks Kushman P.C.; Damian Porcari

(57) ABSTRACT

The present invention discloses a photocurable composition that is combinable with a thermally curable clearcoat composition to form a dual curable composition that is useful for forming clearcoats with improved sag resistance. The photocurable composition of the invention includes at least one photocurable oligomer; a first photoinitiator that absorbs light in a first spectral region such that curing of the photocurable composition preferentially occurs near the surface of the of the coating; and a second photoinitiator that absorbs light in a second spectral region such that curing of the photocurable composition occurs throughout the coating. The present invention also provides a method of coating a substrate with a dual curable composition.

31 Claims, 2 Drawing Sheets

CLEARCOAT INSITU RHEOLOGY CONTROL VIA UV CURED OLIGOMERIC ADDITIVE NETWORK SYSTEM

BACKGROUND OF INVENTION

1. Field of the Invention

In at least one aspect, the present invention relates to methods of coating a substrate with a clearcoat and compositions thereof and, in particular, to methods of coating a substrate with a clearcoat by applying to the substrate a dual curable composition that is first photocurable and then thermally cured.

2. Background Art

Typically, the painted surfaces of an automobile are protected by coating with a clearcoat. Clearcoats protect the vehicle from the deleterious effects of sunlight. Accordingly, these coatings typically have light stabilizers, usually consisting of a combination of UV absorbers and free radical scavengers. The absorbers prevent the energetic rays of the sun from causing permanent damage to the polymer matrix of the clearcoat and the underlying coats, including pigments. The free radical scavengers deactivate the highly reactive species that arise as a result of unwanted breakdown processes, and act to promote further breakdown.

Currently, there are two main categories of clearcoat compositions that are used to form clear coatings. These categories are medium solid coating systems and high solid coating systems. Solid as used in this context refers to components that are not volatile organic compounds (VOC) including liquids with low vapor pressure. Medium solid coating systems typically contain volatile organic solvents in amounts over 70 weight percent. Accordingly, these systems are undesirable because of environmental and health concern. Moreover, such high solvent systems are subject to government regulations in many countries. High solid systems are more desirable because such systems contain much less volatile organic solvents. In the high solid systems, solvents are typically replaced by liquid oligomers or liquid monomers.

Although high solid coating systems are desirable because of the relatively low amounts of VOCs, coatings from such systems often produce coatings marred by sag. Sag refers to the phenomenon of runs and drips that occurs in paint coating. The tendency of a coating to sag results from several factors. For example, sag may occur from edge effects generated from localized high film build around edges, holes in the substrate, character lines, and the like. Sag may also result from the increased surface tension due to solvent evaporation on two surfaces at an edge and by Faraday's Cage effect. Moreover, sag is observed to be thickness dependent. In the absence of flow control agents, reducing the film thickness by a factor of two reduces the sag by a factor of four. Additionally, for a coating containing 3% microgel a similar reduction in coating thickness results in a 12-fold reduction in sag.

Coating reaction kinetics is another factor that needs to be considered in minimizing sag. The maximum temperature reached by a coating prior to gel is an important parameter because it essentially determines the minimum viscosity of the coating after solvent evaporation. Therefore, with respect to sag, it is desirable to utilize coatings with higher rates of reaction. These systems become cross-linked sooner, building molecular weight which increases until the coating gels, thereby avoiding or limiting sag. The temperature at gel is higher for high solids coatings versus medium solids coatings because of the higher extent of reaction at gel for high solids coatings. Accordingly, high solid systems have an increased sag potential due to this phenomenon.

Coating viscosity and cure conditions are additional important factors in controlling sag. If the viscosity is high just after and during cure, then sag may be avoided. However, for high solids coating systems, the low molecular weight resin typically used in these systems and the extent of cure at gel makes sag somewhat inevitable. A significant difference in fluidity between medium solids ("conventional") clearcoat and high solids clearcoat has been observed. Specifically, during a thermal cure cycle the medium solids clear maintained limited fluidity over the range of heating rates, whereas the high solids clear are significantly affected by the heating rate (lower heating rates—resulting in greater fluidity). Similarly, higher molecular weight systems produce limited fluidity as compared to lower molecular weight systems.

Typically, in medium solid coating systems, sag is minimized by the use of large amounts of VOCs during the application and cure of the coating. That is, the high molecular weight resin used in these systems require large amounts of organic solvent(s) to reduce the high molecular weight resins viscosity within the wet coating. High solid coatings use lower molecular weight resins to bring down the viscosity. In doing so, thermal cure sag tolerance has been compromised. In high solids coating systems, reduction of sag depends on rheological control agents ("RCA") to modify the flow and deformation of the liquid coating system. Key characteristics that are sought when adding Theological control agents are to limit settling within the coating, to improve atomization by shear thinning during spray application, and to avoid sag during the thermal cure cycle of the coating by quickly reestablishing a high viscosity after application.

Accordingly, there exists a need from an improved clearcoat composition that contains low amount of volatile organic solvents and produces a coating with low sag.

SUMMARY OF INVENTION

The present invention overcomes the problems encountered in the prior art by providing a method of coating a substrate with a clearcoat by utilizing a composition that is first cured by light and then subsequently thermally cured. The compositions of the present invention produce an interpenetrating polymeric network in the clearcoat prior to stoving. This network acts as a three dimensional high molecular weight resin based rheological control agent focused on improved sag generated in the stoving/curing process of automotive grade topcoats. It is also targeting appearance improvements plus potentially improvements in stone chip resistance and scratch resistance. The present invention accomplishes this by providing a photocurable composition that is combinable with a thermally curable clearcoat composition.

In one embodiment of the present invention, a photocurable composition suitable for combining with a thermally curable clearcoat composition is provided. The photocurable composition of the invention comprises:

a polymer-forming component selected from the group consisting of photocurable oligomers, photocurable monomers, and mixtures thereof;

a first photoinitiator that absorbs light in a first spectral region such that curing of the photocurable composition preferentially occurs near the surface of the of the coating; and a second photoinitiator that absorbs light in a second spectral region such that curing of the photocurable composition occurs throughout the coating.

In another embodiment of the present invention, a dual curable clearcoat composition is provided. The dual curable clearcoat composition comprise at least one photocurable oligomer; a first photoinitiator that absorbs light in a first spectral region such that curing of the photocurable composition preferentially occurs near the surface of the of the coating; and a second photoinitiator that absorbs light in a second spectral region such that curing of the photocurable composition throughout the coating, and a thermally curable clear composition, wherein the first wavelength of light is shorter than the second wavelength of light and the thermally curable composition is curable by heat into a clear coating.

In yet another embodiment of the present invention, a method of coating a substrate with a clearcoat is provided. The method comprises applying a dual curable composition to a substrate followed by curing with light to form a photocured coating on the substrate. The photocured coating is then cured by heat to form the final clearcoat.

DETAILED DESCRIPTION

Figure 1:
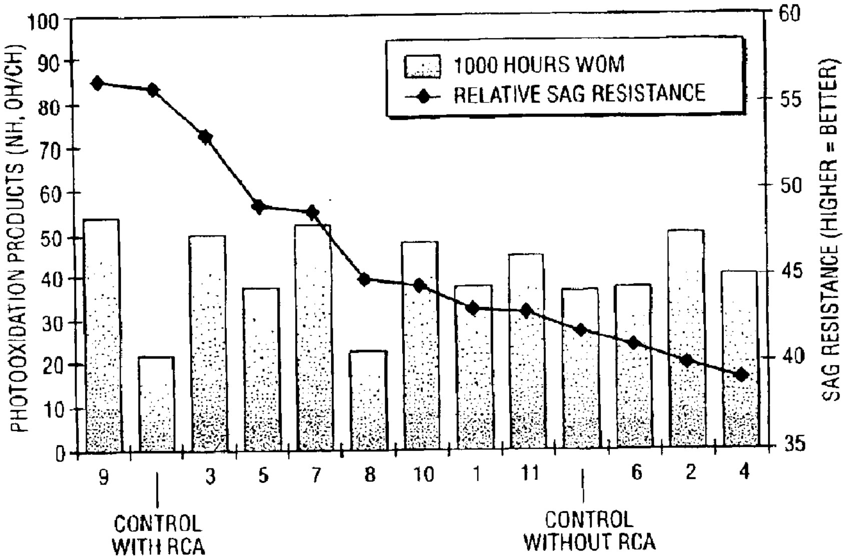
FIG. 1 provides a plot quantifying the sag resistance and photo-oxidation products contained in coatings made use the clearcoat compositions of the present invention.

Reference will now be made in detail to presently preferred compositions or embodiments and methods of the invention, which constitute the best modes of practicing the invention presently known to the inventors.

The term "monomer" as used herein refers to the smallest repeating structure of a polymer. Monomers are relatively simple compounds, usually containing carbon and of low molecular weight (as compared to a polymer), which can react to form a polymer by combination with itself or with other similar molecules or compounds.

The term "oligomer" as used herein refers to a molecule of intermediate molecular weight (as compared to a polymer) consisting of only a few monomer units such as a dimer, trimer, tetramer, etc., or their mixtures.

The term "polymer" as used herein refers to a high-molecular-weight organic compound, natural or synthetic, whose structure can be represented by a repeated small unit (mer). Polymers consist of repeating chemical units held together by covalent bonds which are formed by a polymerization reaction.

The term "available acrylate site" refers the molecular fragment having Formula I:

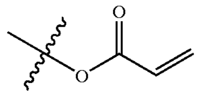

In an embodiment of the present invention, a photocurable composition for forming a coating on an article is provided. The photocurable composition of the invention is combinable with a thermally curable clearcoat composition. The photocurable composition comprises a polymer-forming component selected from the group consisting of photocurable oligomers, photocurable monomers, and mixtures thereof; a first photoinitiator that absorbs light in a first spectral region; and a second photoinitiator that absorbs light in a second spectral region. The absorption characteristics of the first photoinitiator is such that more photocuring of the photocurable composition occurs at a first position near a surface of the coating than at a second position further away from the surface of the coating. The absorption characteristics of the second photoinitiator is such that such that photocuring of the photocurable composition occurs throughout the coating. The surface referred to herein is that surface which is closest to a source of light when the photocurable composition is photocured. Moreover, the photocurable composition of the present invention is combinable with a thermally curable clearcoat composition. The thermally curable clearcoat composition may or may not contain acrylated ligand groups on its backbone. As used herein, combinable means that the photocurable composition and the clearcoat composition are miscible together to form a composition that is clear without a significant amount of cloudiness, i.e., less then 10% of visible light is scattered on average. More preferably, less than 5% of visible light is scattered from such a composition, and most preferably less 1% of visible light is scattered by such a composition. Preferably, the photocurable composition and the thermally curable composition are miscible (that is do not form 2 phases because of the solubility of one component in the another) or the mixing of the photocurable composition and the thermally curable clearcoat composition form a micro-emulsion. When combined with a thermally curable clearcoat composition, the photocurable composition is preferably from about 1% to about 30% of the combined weight of the photocurable composition and the thermally curable clearcoat composition. More preferably, the photocurable composition is from about 2% to about 15% of the combined weight of the photocurable composition and the thermally curable clearcoat composition; and most preferably, the photocurable composition is about 3% of the combined weight of the photocurable composition and the thermally curable clearcoat composition.

The polymer-forming components of this embodiment are preferably acrylated oligomers or acrylated monomers. The acrylated oligomers or monomers are selected based upon ultraviolet light stability, viscosity, color, availability, number of functional groups, performance properties, and the potential to be either cross-linkable or interpenetrating with a thermally curable carbamate clearcoat polymer matrix. The acrylated oligomers are preferably acrylated epoxies, acrylated polyesters, acrylated silicones, acrylated acrylics, acrylated urethanes, acrylated melamines, and mixtures thereof. More preferably, the photocurable oligomers are acrylated urethanes and acrylated melamine; and most preferably, the photocurable oligomer is an acrylated aliphatic urethane. Furthermore, the preferability of urethane acrylated and acrylated melamines is the result of the cure properties of these materials. Specifically, the urethane acrylates will produce interpenetrating networks within the coating matrix, while the acyrlated melamines will produce a condensation cross-link with the carbamate clearcoat along with UV initiated networking prior to thermal cure. The acrylated aliphatic urethanes are particularly advantageous since these oligomers demonstrate good UV durability both for gloss retention and mechanical properties after curing, high cure rates and excellent chemical resistance. Acrylated melamines possess both acrylic and alkoxy functionality which is useful for a dual cure coating system. The presence of both these functionalities allows the coating system to both cross-link and form an interpenetrating network with the thermally curable composition. Furthermore, acrylated melamines are typically curable into coatings with good UV durability. The polymer-component is preferably present in an amount of about 70% to about 98% of the total weight of the photocurable composition. More preferably, the polymer-component is present in an amount of about 75% to about 90% of the total weight of the photocurable composition; and most preferably, the polymer-component is present in an amount of about 80% of the total weight of the photocurable composition.

The polymer-forming component used in the composition of the present invention preferably has at least one acrylate site per monomer unit. More preferably, the polymer-forming component will have at least two available acrylate sites per monomer unit; and most preferably at least three available acrylate sites per monomer unit. Furthermore, the polymer-forming component has at most 6 available acrylate sites per monomer unit in the polymer composition. More preferably, the polymer-forming component has at most three available acrylate sites per monomer unit in the polymer-forming component. Accordingly, the polymer-forming component preferably has from one to six available acrylate sites per monomer unit in the polymer-forming component. More preferably, the polymer-forming component has from two to five available acrylate sites per monomer unit in the polymer-forming component; and most preferably three available acrylate sites per monomer unit in the polymer-forming component.

Preferred acrylates for use in the present invention are curable into hard abrasive-resistant coatings that are chemically, impact, and humidity resistant. Moreover, these acrylates should produce coatings with low shrinkage and good adhesive properties. Specific urethane acrylates suitable for use in the present invention include Bis (2-hydroxy ethyl) isocyanurate triacrylate commercially available from Sartomer as SR-368D; mixed acrylated aliphatic urethanes such as Sartomer's CN 985 B88 (88% a proprietary urethane triacrylate, and 12% Hexandiol Diacrylate (HDODA) and a proprietary urethane diacrylate), tris (2-hydroxy ethyl) isocyanurate trimethacrylate available as Sartomer's SR-290, and 1,6 hexanediol diacrylate available as Satomer's SR-238. Preferably, the acrylates used in the present invention have viscosities from about 150 cP to about 5000 cP at a temperature of 25° C. More preferably, the acrylates used in the present invention have viscosities from about 140 cP to about 1000 cP at 25° C.; and most preferably about 300 cP. Preferred acrylated melamines included Santolink AM-300 and Santolink AM 129 commercially available from Solutia. Santolink AM-300 has an average functionality of 4.0 with a 78% solids content and 22% Methyl Ethyl Ketone. Santolink AM 129 has an average functionality of 3.6, a viscosity of 4000 to 8000 cPs (Brookfield), 97% solids content, and 3% reactive diluent tripropylene glycol diacrylate.

The photocurable composition of the present invention further comprises a dual photoinititator system. The dual photoinitiator system comprises a first photoinitiator that absorbs light in a first spectral region such that curing of the photocurable composition preferentially occurs near the surface of the of the coating; and a second photoinitiator that absorbs light in a second spectral region such that curing of the photocurable composition occurs throughout the coating. The first photoinitiator is preferably present in an amount of about 1% to 15% of the total weight of the photocurable composition. More preferably, the first photoinitiator is present in an amount of about 2% to 10% of the total weight of the photocurable composition. Similarly, the second photoinitiator is preferably present in an amount of about 1% to 15% of the total weight of the photocurable composition. More preferably, the second photoinitiator is present in an amount of about 2% to 10% of the total weight of the photocurable composition. Typically, the second photoinitiator absorbs light on average at longer wavelengths than the first photoinitiator. The first photoinitiator is characterized by one or more of the following: an extinction coefficient at a light wavelength of about 302 nm that is less than about $1.0\times10^4$ ml/(g-cm), an extinction coefficient at a light wavelength of about 313 nm that is less than about $1.0\times10^4$ ml/(g-cm), and an extinction coefficient at a light wavelength of about 365 nm that is less than about $1.0\times10^3$ ml/(g-cm). The second photoinitiator is characterized by one or more of the following: an extinction coefficient at a light wavelength of about 302 nm that is greater than about $1.0\times10^4$ ml/(g-cm), an extinction coefficient at a light wavelength of about 313 nm that is greater than about $1.0\times10^4$ ml/(g-cm), and an extinction coefficient at a light wavelength of about 365 nm that is greater than about $1.0\times10^3$ ml/(g-cm).

Suitable first photoinitiators, include Irgacure 819 (bisacylphophinoxide), Irgacure 369, Irgacure 1300, and Irgacure 907. Suitable second photoinitiators, include but are not limited to, Darocur 1173, Darocur 4625, Irgacure 184, Irgacure1700, and Irgacure 1800. This photo-initiator also maintains good surface cure properties, which aid in overcoming oxygen inhibition at the clearcoat surface. It is a white granular powder. Darocur1173 (2-hydroxy-2-methyl-1-phenyl-propan-1-one) is a clear colorless liquid and is non-yellowing. It also has good solvency properties, which make it ideal for making photoinitiator blends. Irgacure 1700 (25% bis(2,6-dimethoxybenzoyl)-2,4,4-trimethylpentyl phosphine oxide+75% 2-hydroxy-2-methyl-1-phenyl-propan-1-one) is a clear yellow liquid preferred for thick clearcoats and for fortified clearcoats as it has good long wavelength light absorption. The good long wavelength absorption also improves through-cure response to aid in avoiding surface wrinkle. Durocur 4625 (50% 2,4,6-trimethylbenzoyl-diphenylphosphine oxide+50% 2-hydroxy-2-methyl-1-phenyl-1-one) is recommended for clearcoats with the long-term non-yellowing Florida exposure performance and also preferred for thick clearcoats. It is a clear liquid with slight yellow color.

In another embodiment of the present invention, a dual curable clearcoat composition is provided. As used herein, dual-curable means the composition is fully cured by photocuring followed by thermal curing. The dual curable composition comprises the photocurable composition set forth above. Specifically, the dual curable composition comprises:

a photocurable composition including:

at least one photocurable oligomer;

a first photoinitiator that absorbs light in a first spectral region such that more photocuring of the photocurable composition occurs at a first position near a surface of the coating than at a second position further away from the surface of the coating; and a second photoinitiator that absorbs light in a second spectral region such that photocuring of the photocurable composition occurs throughout the coating, a thermally curable clearcoat composition that is curable by heat into a clear coating. The weight ranges and selection of the polymer-forming component, the first photoinitiator, and the second photoinitiator are the same as set forth above. The thermally curable clearcoat composition may or may not contain acrylated ligand groups on its backbone. The preferred thermally curable composition is an acrylocarbammate composition with a melamine cross-linker. Moreover, the photocurable composition is preferably from about 1% to about 30% of the combined weight of the photocurable composition and the thermally curable clearcoat composition. More preferably, the photocurable composition is from about 2% to about 15% of the combined weight of the photocurable composition and the thermally curable clearcoat composition; and most preferably, the photocurable composition is about 3% of the combined weight of the photocurable composition and the thermally curable clearcoat composition.

In yet another embodiment of the present invention, a method of coating a substrate with a clearcoat is provided. The method comprises applying the dual curable composition of the present invention to a substrate followed by curing with light to form a photocured coating on the substrate. The method of this embodiment comprises combining a photocurable composition comprising:

at least one photocurable oligomer;

a first photoinitiator that absorbs light in a first spectral region such that more photocuring of the photocurable composition occurs at a first position near a surface of the coating than at a second position further away from the surface of the coating; and a second photoinitiator that absorbs light in a second spectral region such that photocuring of the photocurable composition occurs throughout the coating, with a thermally curable clearcoat composition to form a dual curable composition, the durable curable composition is curable by both illumination with light and by exposure to heat;

applying the dual curable composition to the substrate to form a coated substrate;

illuminating the coated substrate with light for a sufficient period of time to cure the coated substrate into a photo cured coated substrate; and applying heat to the photo-cured substrate for a sufficient time to cure the photo-cured coated substrate into a clearcoat-coated substrate.

The following examples illustrate the various embodiments of the present invention. Those skilled in the art will recognize many variations that are within the spirit of the present invention and scope of the claims.

Test Methods

1. Sag Resistance

Test panels containing a series of holes were prepared from 12 inch×36 inch coil coated steel with virtually no draw lines. The series of holes were linearly arranged. Initially, the test panels were arranged so that the linearly arranged holes are perpendicular to the ground. The oriented test panels were sprayed with the clearcoat compositions of the present invention as well as with control composition. Spraying started near the top of the panels and completed near the bottom. Moreover, the spray gun was moved in a reciprocating horizontally direction. Furthermore, the spraying of the clearcoat was such that there is a thickness gradient along the linear direction along which the holes are arranged. Movement of the panels and spraying were automated using a Herbert's Finger Print Analysis System laboratory application robot and an air atomized DeVilbus non-electrostatic gun.

The sprayed panels were immediately irradiated with a 300-watt/inch microwave powered electrode-less UV lamp employing a hydrogen bulb. The panels passed under the lamp in a horizontal position. This was done at a line rate of 18 feet per minute. Each panel was processed under the lamp five times to increase the UV dosing in an attempt to maximize through-cure. The Fusion UV Systems Model LC-6 benchtop conveyor was fitted with a focused elliptical reflector to concentrate maximum UV energy, on the panel surfaces. To create uniformity within the testing matrix even the controls systems were processed under the UV lamps to create the exact same flash conditions. Each panel was then further flashed vertically (i.e., in a position that causes dripping under the force of gravity) at room temperature for ten minutes. This was done 90° out of phase with the direction that the clearcoat wedge was applied.

The application and flash process created edge build around the holes within the panel, due in part to air flow through the holes and surface tension changes in the film as applied and during the ambient flash. The panels were then baked in a gas direct-fired laboratory oven at 285° F. for 30 minutes total ambient time. Sag was evaluated by measuring the thickness of the coating at a drip that extends 1 cm from the holes. Since it is somewhat unlikely to have a drip of exactly 1 cm., the thicknesses of experimentally observed drips of varying extent were measured and used to interpolate to a thickness for a 1 cm drip.

2. Photo-Oxidation Products

Fully cured coated samples were exposed in a Ci-35 xenon arc Weather-ometer ("WOM") for 1000 hours. Subsequently, photo-oxidation products were determined by FTIR photo-acoustic spectroscopy of the coatings with a Mattson Cygnus 100 Rapid Scan FTIR. Photo-oxidation product accumulation is calculated by taking the ratio of the integrated area under the v OH, v NH peaks (3700 to 2750 $cm^{-1}$) of the infrared spectra to the integrated area under the v CH peaks (3125 to 2650 $cm^{-1}$) which is seen after weathering. The time zero ratio is then subtracted from the time after exposure and this difference is then taken as a measure of accumulated photo-oxidation products.

3. Surface Texture

Surface texture was measured on each system using a Byk-Gardner Wave-Scan Plus, which measures long wave structure (>0.6 mm) and short wave surface structure (<0.6 mm). This instrument optically scans the wavy light-dark patterns generated by texture or orange peel on the surface of a coating. The instrument is rolled over a 10 cm distance as a 60°-angled laser point light source illuminates the specimen and a detector measures the reflected light at the equal but opposite angle. The measurements are broken into two groups—a long wave value and a short wave value. The long and short wave values are reported on a scale of 0 through 99.9. In both cases, the lower the value the smoother the surface.

4. Brittle Fracture Scratch

Brittle fracture scratch based upon the CSEM Nano Scratch Test was conducted on a series of dual cure systems. This scratch testing consists of introducing stresses at the surface of the coating through to the interface with the substrate. This is achieved by pressing a diamond stylus on the sample surface with a normal load (i.e., perpendicular to the surface.) As the sample is displaced at constant speed, the resulting stresses at the interface cause flaking or chipping of the coating. The smallest load at which a failure occurs is recorded as the brittle fracture scratch in mN.

EXAMPLES

Table 1 provides the composition of 11 clearcoat compositions that demonstrate the utility of the present invention. The composition were prepared by combining the number of grams of each component indicated with a 300 g sample of carbamate clearcoat composition (acrylocarbamate with melamine cross-linkers). Moreover, the carbamate clearcoat composition contained standard fortification (UV absorber and Hindered Amine Light Stabilizer) with no finned silica, rheological control agent. In preparing these examples, Santolink AM300 is blended with one third by weight hydroxyl ethyl acrylate. Sartomer CN985 is a mixed acrylated aliphatic urethanes (88% a proprietary urethane triacrylate, and 12% Hexandiol Diacrylate (HDODA) and a proprietary urethane diacrylate). Santolink AM300 is an acrylated melamine commercially available from Solutia. Darocur 4265 is a photoinitiator that induces curing throughout the thickness of an applied clearcoat. It is a mixture of 2,4,6-trimethylbenxoyl-diphenylphoshhine oxide and 2-hydroxy-2methyl-1-phenyl-propan-1-one. Irgacure 819 (bis-acylphophinoxide) is a photoinitiator that promotes curing near the surface of the coating closes to the light source.

TABLE 1

| | Amount in grams added to a 300 g sample of Carbamate clearcoat. | | | | |
|---|---|---|---|---|---|
| Example | Sartomer CN985 B88 | Darocur 4265 | Santolink AM 300 | Hydroxy ethyl acrylate | Irgacure 819 |
| 1 | 3.42 | 1.06 | 4.43 | 1.56 | 0.24 |
| 2 | 6.65 | 0.62 | 0 | 0 | 0 |
| 3 | 20.609 | 0.78 | 4.38 | 1.58 | 0.76 |
| 4 | 3.384 | 0.3976 | 0 | 0 | 0 |
| 5 | 20.116 | 2.44 | 0 | 0 | 0.6 |
| 6 | 4.868 | 0.24 | 4.09 | 1.55 | 0 |
| 7 | 19.895 | 3.11 | 4.65 | 1.57 | 0 |
| 8 | 3.529 | 0.08 | 0 | 0 | 0.09 |
| 9 | 19.707 | 3.09 | 4.47 | 1.56 | 0.77 |
| 10 | 3.346 | 0.10 | 0 | 0 | 0 |
| 11 | 11.765 | 1.11 | 3.04 | 0.79 | 0.22 |

Referring to FIG. 1, the sag resistance and photo-oxidation products are determined by the methodologies set forth above is provided. All included in FIG. 1 is the results for a control which contains a rheology control agent ("RCA") and a control sample which does not contain an RCA. Examples 3 and 9 are observed to have superior sag resistance that is comparable to the control with an RCA. Both of these samples have a dual photoinitiator system wherein one photoinitiator tends to induce curing throughout the coating and a second which induces curing near the surface closest to the light source. Moreover, both these samples include both a urethane acrylate and a melamine acrylate. Furthermore, samples 5 and 8 have significantly improved sag resistance when compared to a control which does not have an RCA. Both of these samples contain a dual photoinitiator system and only a urethane acrylate. Moreover, it is observed in FIG. 1 that the amount of photo-oxidation products are acceptable for most coating operations. A value of 50 or below is generally viewed as acceptable. Sample 5 and 8 fall well with the permitted limit for this value.

Figure 2:
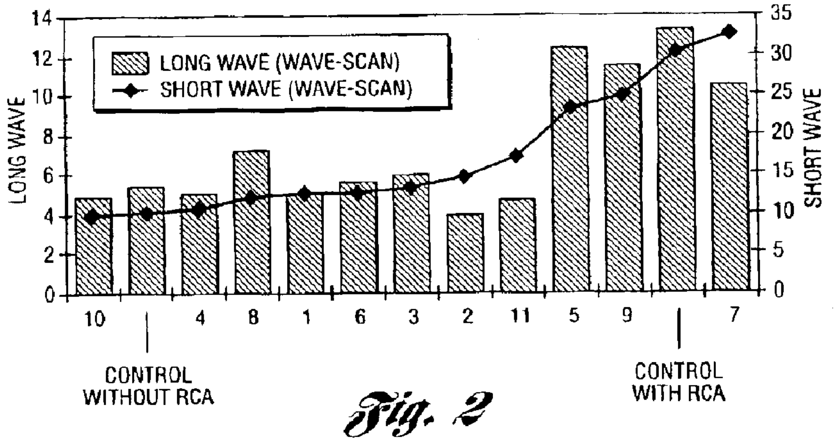
FIG. 2 is a plot providing long wave structure (>0.6 mm) and short wave surface structure (<0.6 mm) to quantify the surface texture of coatings made with the clearcoat compositions of the present invention.

FIG. 2 provides a measure of the surface texture by the method described above. FIG. 2 demonstrates that most of the samples have less surface texture than a control with an RCA. Furthermore, most of the samples have a surface texture that is comparable to a control without an RCA.

Figure 3:
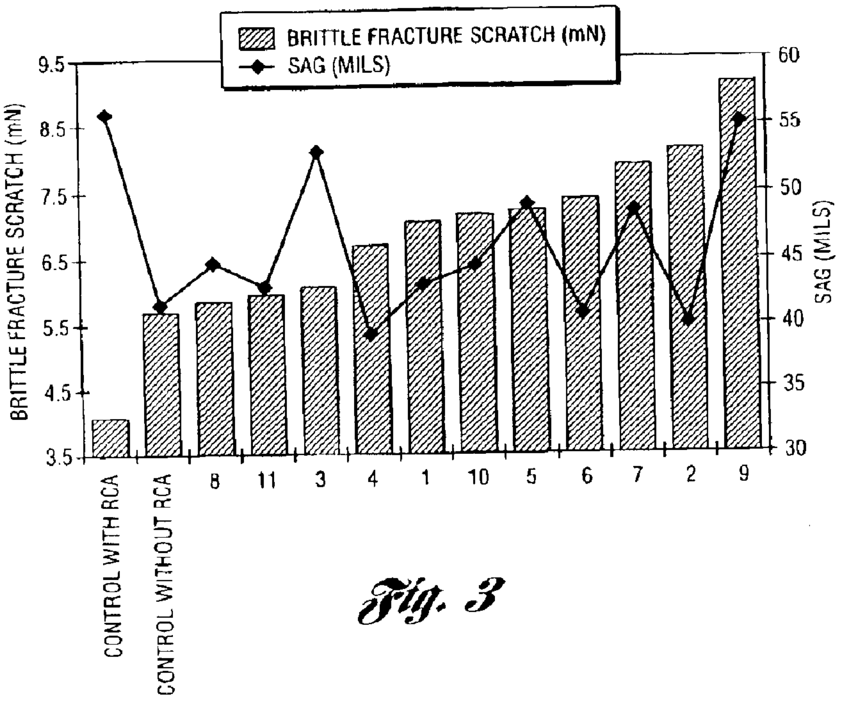
FIG. 3 provides a plot quantifying the scratch resistance of coatings made use the clearcoat compositions of the present invention.

FIG. 3 provides measurements of the scratch resistance as determined by the method described above. FIG. 3 also provides the sag resistance for each sample. Each of the samples is observed to be more scratch resistant than both controls. Moreover, samples 5, 7, and 9 are observed to combine high sag resistance with a high scratch resistance.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A dual-curable clearcoat composition comprising:

a photocurable composition comprising:

a polymer-forming component selected from the group consisting of photocurable oligomers, photocurable monomers, and mixtures thereof;

a first photoinitiator that absorbs light in a first spectral region; and a second photoinitiator that absorbs light in a second spectral region; and a thermally curable clearcoat composition that is curable by heat into a clear coating;

wherein the dual-curable clearcoat composition is curable into a clearcoat on a substrate by:

applying the dual-curable composition to the substrate an uncured coated substrate;

illuminating the uncured coated substrate with light to form a photo cured coated substrate; and heating the photo cured substrate to form the clearcoat on the substrate, wherein the photocurable composition is from about 1% to about 30% of the combined weight of the photocurable composition and the thermally curable clearcoat composition.

2. The dual curable composition of claim 1 wherein the first photoinitiator absorbs light such that more photocuring of the photocurable composition occurs at a first position near a surface of the coating than at a second position further away from the surface of the coating and the second photoinitiator absorbs light such that photocuring of the photocurable composition occurs throughout the coating.

3. The dual curable composition of claim 1 wherein the second photoinitiator absorbs light on average at longer wavelengths than the first photoinitiator.

4. The dual curable composition of claim 1 wherein:

the first photoinitiator is characterized by one or more of the following: an extinction coefficient at a light wavelength of about 302 nm that is less than about $1.0\times10^4$ ml/(g-cm), an extinction coefficient at a light wavelength of about 313 nm that is less than about $1.0\times10^4$ ml/(g-cm), and an extinction coefficient at a light wavelength of about 365 nm that is less than about $1.0\times10^3$ ml/(g-cm); and the second photoinitiator is characterized by one or more of the following: an extinction coefficient at a light wavelength of about 302 nm that is greater than about $1.0\times10^4$ ml/(g-cm), an extinction coefficient at a light wavelength of about 313 nm that is greater than about $1.0\times10^4$ ml/(g-cm), and an extinction coefficient at a light wavelength of about 365 nm that is greater than about $1.0\times10^3$ ml/(g-cm).

5. The dual curable composition of claim 1 wherein the first photoinitiator is present in an amount of about 1% to about 15% of the total weight of the photocurable composition; and the second photoinitiator is present in an amount of about 1% to about 15% of the total weight of the photocurable composition.

6. The dual curable composition of claim 1 wherein the polymer-forming component is an acrylated oligomer.

7. The dual curable composition of claim 6 wherein the acrylated oligomer have from 1 to 6 acrylate sites.

8. The dual curable composition of claim 6 wherein the acrylated oligomer have from 3 to 5 acrylate sites.

9. The dual curable composition of claim 1 wherein the polymer-forming component is selected from the group consisting of acrylated epoxy oligomers, acrylated polyester oligomers, acrylated silicone oligomers, acrylated acrylic oligomers, acrylated urethane oligomers, acrylated melamine oligomer, and mixtures thereof.

10. The dual curable composition of claim 1 wherein the polymer-forming component is a urethane acrylate or an acrylated melamine.

11. A method of applying a clearcoat coating to a substrate, the method comprising:

combining a photocurable composition comprising:

a polymer-forming component selected from the group consisting of photocurable oligomers, photocurable monomers, and mixtures thereof;

a first photoinitiator that absorbs light in a first spectral region such that more photocuring of the photocurable composition occurs at a first position near a surface of the coating than at a second position further away from the surface of the coating; and a second photoinitiator that absorbs light in a second spectral region such that photocuring of the photocurable composition occurs throughout the coating, with a thermally curable clearcoat composition to form a dual curable composition, the durable curable composition is curable by both illumination with light and by exposure to heat;

applying the dual curable composition to the substrate to form a coated substrate;

illuminating the coated substrate with light for a sufficient period of time to cure the coated substrate into a photo cured coated substrate; and applying heat to the photo-cured substrate for a sufficient time to cure the photo cured coated substrate into a clearcoat-coated substrate.

12. The method of claim 11 wherein the first photoinitiator absorbs light such that more photocuring of the photocurable composition occurs at a first position near a surface of the coating than at a second position further away from the surface of the coating and the second photoinitiator absorbs light such that photocuring of the photocurable composition occurs throughout the coating.

13. The method of claim 11 wherein the second photoinitiator absorbs light on average at longer wavelengths than the first photoinitiator.

14. The method of claim 11 wherein:

the first photoinitiator is characterized by one or more of the following: an extinction coefficient at a light wavelength of about 302 nm that is less than about $1.0\times10^4$ ml/(g-cm), an extinction coefficient at a light wavelength of about 313 nm that is less than about $1.0\times10^4$ ml/(g-cm), and an extinction coefficient at a light wavelength of about 365 nm that is less than about $1.0\times10^3$ ml/(g-cm); and the first photoinitiator is characterized by one or more of the following: an extinction coefficient at a light wavelength of about 302 nm that is greater than about $1.0\times10^4$ ml/(g-cm), an extinction coefficient at a light wavelength of about 313 nm that is greater than about $1.0\times10^4$ ml/(g-cm), and an extinction coefficient at a light wavelength of about 365 nm that is greater than about $1.0\times10^3$ ml/(g-cm).

15. The method of claim 11 wherein the first photoinitiator is present in an amount of about 1% to about 15% of the total weight of the photocurable composition; and the second photoinitiator is present in an amount of about 1% to about 15% of the total weight of the photocurable composition.

16. The method of claim 11 wherein the polymer-forming component is an acrylated oligomer.

17. The method of claim 16 wherein the acrylated oligomer has from 1 to 6 acrylate sites.

18. The method of claim 16 wherein the acrylated oligomer has from 3 to 5 acrylate sites.

19. The method of claim 11 wherein the polymer-forming component is selected from the group consisting of acrylated epoxy oligomers, acrylated polyester oligomers, acrylated silicone oligomers, acrylated acrylic oligomers, acrylated urethane oligomers, acrylated melamine oligomer, and mixtures thereof.

20. The method of claim 11 wherein the polymer-forming component is a urethane acrylate or an acrylated melamine.

21. The method of claim 11 wherein the photocurable composition is from about 1% to about 30% of the combined weight of the photocurable composition and the thermally curable clearcoat composition.

22. A dual-curable clearcoat composition comprising:

a photocurable composition comprising:

a polymer-forming component selected from the group consisting of photocurable oligomers, photocurable monomers, and mixtures thereof;

a first photoinitiator that absorbs light in a first spectral region; and a second photoinitiator that absorbs light in a second spectral region; and a thermally curable clearcoat composition that is curable by heat into a clear coating;

wherein the dual-curable clearcoat composition is curable into a clearcoat on a substrate by:

applying the dual-curable composition to the substrate an uncured coated substrate;

illuminating the uncured coated substrate with light to form a photo cured coated substrate; and heating the photo cured substrate to form the clearcoat on the substrate, wherein:

the first photoinitiator is characterized by one or more of the following: an extinction coefficient at a light wavelength of about 302 nm that is less than about $1.0\times10^4$ ml/(g-cm), an extinction coefficient at a light wavelength of about 313 nm that is less than about $1.0\times10^4$ ml/(g-cm), and an extinction coefficient at a light wavelength of about 365 nm that is less than about $1.0\times10^3$ ml/(g-cm); and the second photoinitiator is characterized by one or more of the following: an extinction coefficient at a light wavelength of about 302 nm that is greater than about $1.0\times10^4$ ml/(g-cm), an extinction coefficient at a light wavelength of about 313 nm that is greater than about $1.0\times10^4$ ml/(g-cm), and an extinction coefficient at a light wavelength of about 365 nm that is greater than about $1.0\times10^3$ ml/(g-cm).

23. The dual curable composition of claim 22 wherein the first photoinitiator absorbs light such that more photocuring of the photocurable composition occurs at a first position near a surface of the coating than at a second position further away from the surface of the coating and the second photoinitiator absorbs light such that photocuring of the photocurable composition occurs throughout the coating.

24. The dual curable composition of claim 22 wherein the second photoinitiator absorbs light on average at longer wavelengths than the first photoinitiator.

25. The dual curable composition of claim 22 wherein the first photoinitiator is present in an amount of about 1% to about 15% of the total weight of the photocurable composition; and the second photoinitiator is present in an amount of about 1% to about 15% of the total weight of the photocurable composition.

26. The dual curable composition of claim 22 wherein the polymer-forming component is an acrylated oligomer.

27. The dual curable composition of claim 26 wherein the acrylated oligomer have from 1 to 6 acrylate sites.

28. The dual curable composition of claim 26 wherein the acrylated oligomer have from 3 to 5 acrylate sites.

29. The dual curable composition of claim 22 wherein the polymer-forming component is selected from the group consisting of acrylated epoxy oligomers, acrylated polyester oligomers, acrylated silicone oligomers, acrylated acrylic oligomers, acrylated urethane oligomers, acrylated melamine oligomer, and mixtures thereof.

30. The dual curable composition of claim 22 wherein the polymer-forming component is a urethane acrylate or an acrylated melamine.

31. The dual curable composition of claim 22 wherein the photocurable composition is from about 1% to about 30% of the combined weight of the photocurable composition and the thermally curable clearcoat composition.

* * * * *